United States Patent [19]
Robinson

[11] 4,293,320
[45] Oct. 6, 1981

[54] HIGH ENERGY REVERSE AIR DUST COLLECTOR

[75] Inventor: James W. Robinson, Woodridge, Ill.

[73] Assignee: Research-Cottrell, Somerville, N.J.

[21] Appl. No.: 96,906

[22] Filed: Nov. 23, 1979

[51] Int. Cl.³ .................................................. B01D 46/04
[52] U.S. Cl. .................................... 55/273; 55/283; 55/294; 55/302; 55/341 R
[58] Field of Search ............... 55/283, 294, 302, 341 R, 55/273, 284, 242

[56] References Cited

U.S. PATENT DOCUMENTS

| 3,483,675 | 12/1969 | King, Jr. | 55/294 X |
| 3,487,609 | 1/1970 | Caplan | 55/294 X |
| 3,490,207 | 1/1970 | Sare | 55/294 |
| 3,777,458 | 12/1973 | Dence | 55/294 X |
| 3,813,853 | 6/1974 | Anderson | 55/283 X |
| 3,951,627 | 4/1976 | Barr, Jr. et al. | 55/284 |
| 4,144,042 | 3/1979 | Noland | 55/294 X |

FOREIGN PATENT DOCUMENTS 2518377 11/1976 Fed. Rep. of Germany ........ 55/294

Primary Examiner—Kathleen J. Prunner
Attorney, Agent, or Firm—Paul & Paul

[57] ABSTRACT

Apparatus for removing and collecting dust from dust laden air includes a traveling manifold which travels through an upper clean-air chamber back and forth from one end of the baghouse to the other. Process air is directed upwardly and inwardly through the walls of an array of filter bags suspended in a lower chamber. At the upper ends of the filters bags are open mouths which communicate with the upper chamber. Pressurized reverse-direction air is injected from the traveling manifold into the mouths of the filter bags through openings in a flat cover plate. A bag support plate, located beneath the cover plate, separates the lower dust-laden air chamber from the upper clean-air chamber. The reverse air is injected successively into the mouths of a single row of filter bags for forcing air outwardly through the fabric walls of the filter bags to cause dust accumulated thereon to drop off and fall into the lower chamber. The traveling manifold is provided with leading and trailing seal plates which register against the flat cover plate and prevent the pressurized reverse air from escaping into the upper clean-air chamber and force it to flow downwardly into the interior of the filter bags. Means are provided for maintaining the seal plates close to the flat cover plate as the manifold travels thereover, and for adjusting the angular position of the seal plates. End seal plates are also provided.

13 Claims, 9 Drawing Figures

HIGH ENERGY REVERSE AIR DUST COLLECTOR

BACKGROUND OF THE INVENTION

This invention relates to apparatus intended for commercial or industrial use (as distinguished from domestic use) for removing particulate matter, such as dust, from a stream of gas, such as air, by filter bag filtration.

It is known in the prior art to perform industrial filtration or dust collection in a rectangular housing or baghouse containing an array of suspended tubular filter bags. Such bags may be fabric bags with a wire cage reinforcement. The baghouse is usually divided into two plenum chambers, a lower chamber and an upper chamber. The filter bags are suspended in the lower chamber but the mouths of the bags communicate with the upper chamber. The dust-laden process air is pushed or drawn, as by a blower or fan, into the lower chamber, passes through the fabric walls into the interior of the bags and is delivered as clean air through the mouths of the bags into the upper or clean-air compartment. As the dust-laden air passes through the fabric walls into the interior of the filter bags, dust accumulates on the outer surface of the bag wall and, unless cleaned, a cake or accumulation of dust would build up on the outer wall of the bag, thereby reducing and eventually preventing the flow of air through the wall into the interior of the bag.

The prior art has provided various methods for cleaning the bags, i.e. for removing the cake of dust from the bag walls. One method is to blow pressurized air in a reverse direction through the bag walls. This is done by injecting air under pressure into the mouths of the bags to cause it to flow downwardly and outwardly through the fabric walls, thereby dislodging the dust accumulated on the outer surface of the bag walls and causing it to fall to the bottom of the lower chamber of the baghouse.

For the purpose of injecting reverse air under pressure into the mouths of the filter bags for the purpose of dislodging the dust accumulated on the outer surface of the bag, the prior art has provided a traveling cleaning head or manifold which injects pressurized air into a single row of bags at a time. Such apparatus is shown in U.S. Pat. Nos. 3,482,378 and 4,097,254. In these patents, a portion of the upper or clean-air chamber above the mouths of the filter bags is divided, by spaced vertical partition plates, into a series of compartments, one compartment for each one-half row of filter bags, and, as the traveling manifold or cleaning head travels through the clean-air compartment and comes into registry with a compartment mouth, pressurized reverse air is delivered into the mouth of that compartment, thereby injecting air into the mouths of the row of filter bags located in that particular compartment. The pressurized reverse air is shut off as the manifold moves to the next compartment, where, when the manifold is again in registry with the mouth of that compartment, the pressurized air supply is again turned on.

SUMMARY OF THE INVENTION

A principal object of the present invention is to provide improvement over the apparatus described hereinabove where the clean-air chamber area above the mouths of the filter tubes is separated into separate compartments by vertical partition plates, and where as the traveling manifold or cleaning head travels within the clean-air chamber from one compartment to the next, the pressurized reverse air is turned on and off according to whether the manifold is in registry or out of registry with the mouth of a compartment.

Another object is to provide apparatus of the foregoing type which avoids the necessity of dividing the upper or clean-air chamber into individual compartments.

Another object of the present invention is to provide apparatus of the above type in which the supply of pressurized reverse air flows continuously as the manifold or cleaning head moves continuously through the clean-air chamber from one end of the baghouse to the other, stopping only at each end of the baghouse.

Another object is to provide sealing means, in apparatus of the above type in which pressurized reverse air flows continuously, for preventing pressurized reverse air from escaping into the upper or clean air chamber during the continuous travel of the manifold through the clean-air chamber from one end of the baghouse to the other.

Another object is to provide pressurized air from a stationary source to the moving manifold or cleaning head.

Another object is to provide means, including a diverter valve which is sequenced with manifold travel, for cleaning one half of a row of bags at a time, to conserve power requirements and consumption.

Another object is to use a standard rectangular baghouse housing and to move the traveling manifold back and forth across the top of the baghouse—not along the side of the baghouse as in some prior art systems.

BRIEF DESCRIPTION OF THE DRAWINGS

FIG. 1 also shows, by means of heavier arrows, the path of the pressurized reverse air flow which is injected into the open upper ends of the bags to force air outwardly through the fabric walls thereof, thereby to remove the dust which has collected on the outer walls of the bags and cause it to drop to the bottom of the bag house.

DETAILED DESCRIPTION OF THE PREFERRED EMBODIMENTS

Figure 1:
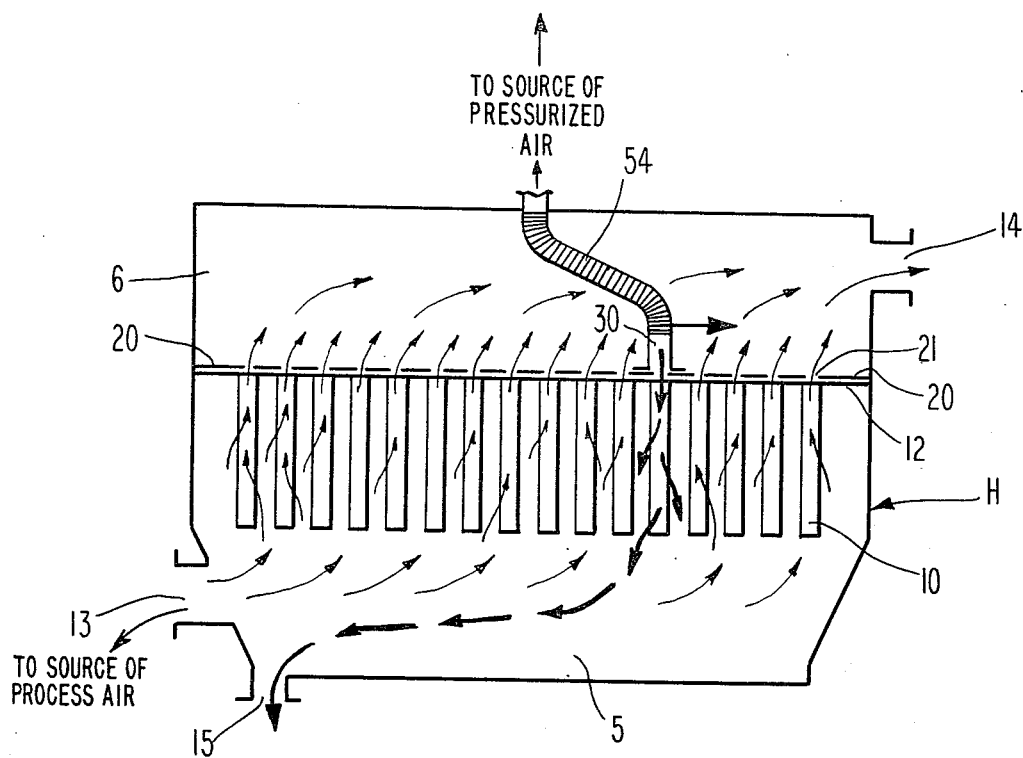
FIG. 1 is a diagrammatic illustration of a baghouse showing, by means of arrows, the paths of the pressurized air flow which is drawn into the tubular filter bags through the fabric walls thereof, whereby dust is removed from the air and collects on the outer walls of the filter bags.

As has already been indicated, FIG. 1 illustrates, by means of arrows, the air-flow paths through the baghouse H. Dust-laden air is blown, as by a blower (not shown) into lower plenum chamber 5. This air enters at inlet 13 and exits at outlet 14 in upper plenum chamber 6. The filter bags 10 are preferably, but not necessarily, of circular cross-section and of fabric, wire-reinforced. The bags have closed bottoms and open tops. The bags are suspended from a support plate 12. Their open upper ends are in registry with holes 21 in a cover plate 20. Holes 21 are preferably circular, but need not be. The dust-laden process air which enters lower chamber 5 at inlet 13 is drawn through the vertical walls of the array of filter bags 10 and into the interiors thereof. The dust remains on the outer surface of the bag. The clean air is drawn up through the interior of the bags, through holes 21 in plate 20, into upper chamber 6 and out through exit 14. The action is continuous.

Simultaneously with the continuous removal of dust (or other particulate) from the air (or other gas) as briefly described above, high-energy pressurized air is blown in a reverse direction (sometimes referred to herein as reverse air) through a "knee" duct 54 into a traveling cleaning head or air-distribution manifold 30. Manifold 30 travels back and forth reciprocally and continuously for the length of the baghouse H. The manifold 30 has a width (in the lengthwise direction of the baghouse) sufficient to cover but a single row of filter bags 10. Thus, at any given time, the high-energy pressurized air passing down duct 54 and into manifold 30 passes through a single row of openings 21 in cover plate 20 into the open upper ends of a single row of bags 10. This air passes out through the vertical walls of the tubular bags thereby causing the dust or other particulate matter which had accumulated on the outer surface of the bag wall to drop off into lower chamber 5. This dust is drawn out through discharge opening 15.

Figure 2:
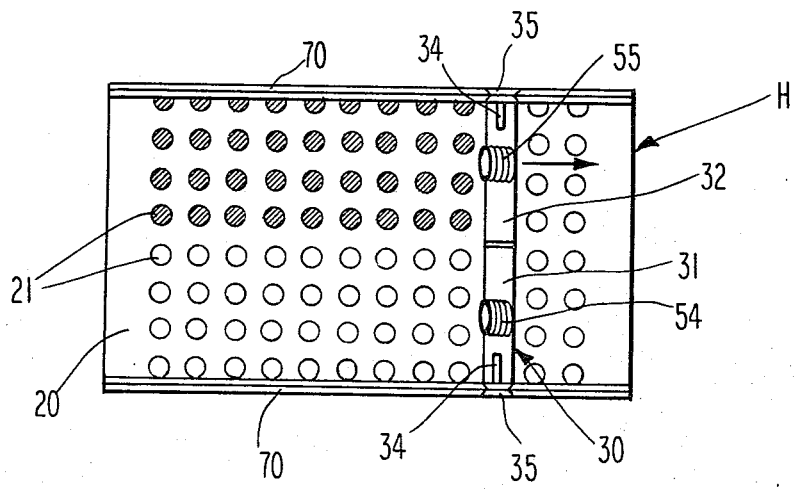
FIG. 2 is a plan diagrammatic view illustrating how a traveling cleaning head or air-distribution manifold cleans the filter bags located on one side of the lengthwise center line of the baghouse, one row at a time, during travel in one direction and cleans the filter bags on the other side of the center line, one row at a time, during the travel in the opposite direction.

Reference is now made to FIG. 2. This figure shows that the tubular filter bags 10 are arranged in an array of uniformly spaced parallel rows transverse to the lengthwise axis of the baghouse H. An equal number of filter bags in each transverse row are on each side of the longitudinal center line. In the illustration, four bags are shown on each side of the center line. The cleaning head or air-distribution manifold 30 is made up of two sections, one on each side of the center line. These sections are identified 31 and 32 in FIG. 2. The two sections are tied together by transverse support channels and the two-sectioned manifold 30 travels back and forth as a unit. As illustrated in FIG. 2, during travel of manifold 30 from left to right, section 32 is active, and the filter bags which are in the right half (as viewed looking in from the right of the drawing) are cleaned, one-half of one full row at a time, successively. In FIG. 2, the four filter bags in each row on the right side of the center line which are cleaned by section 32 as the traveling manifold 30 moves from left to right, are identified by the shaded circles. The filter bags which have not yet been cleaned are illustrated by the clear circular areas. In FIG. 2, as the traveling manifold 30 completes its travel to the right, the remaining bags in the last rows on the right of the center line will be cleaned, by manifold section 32, one half of one full row at a time, successively. On the return trip, i.e., as the manifold 30 travels from right to left, section 31 will be active and the four filter bags in each row on the left side of the center line (as viewed from the right) will be cleaned as the manifold passes thereover. The cleaning is effected by pressurized reverse air which passes downwardly through one of the "knee" ducts 54 or 55. During travel of the manifold 30 from right to left, no pressurized reverse air is blown through "knee" duct 55 and section 32. During travel from left to right, no reverse air is blown through duct 54 and section 31. As already described, in connection with FIG. 1, the pressurized high-energy reverse air passes from the interior of the filter bags out through the fabric walls thereof, causing the dust which had accumulated on the outer surface of the bag walls to drop downwardly toward lower chamber 5, and to be removed through dust discharge opening 15.

The reverse-air action described above continues throughout the operation of the baghouse. That is to say, during the same time period that dust-laden air is being blown, as by a blower, into lower chamber 5 through inlet 13 and is being cleaned by passage inwardly through the walls of the tubular filter bags 10, one half of one full row of filter bags is being cleaned successively by the passage of pressurized high-energy reverse air down through one or the other of "knee" ducts 54 or 55, and into one or the other of manifold sections 31 or 32, causing dust which had accumulated on the outer surfaces of the walls of the bags of the one-half row to drop off into lower chamber 5, and to be drawn out of through dust discharge opening 15.

Figure 3:
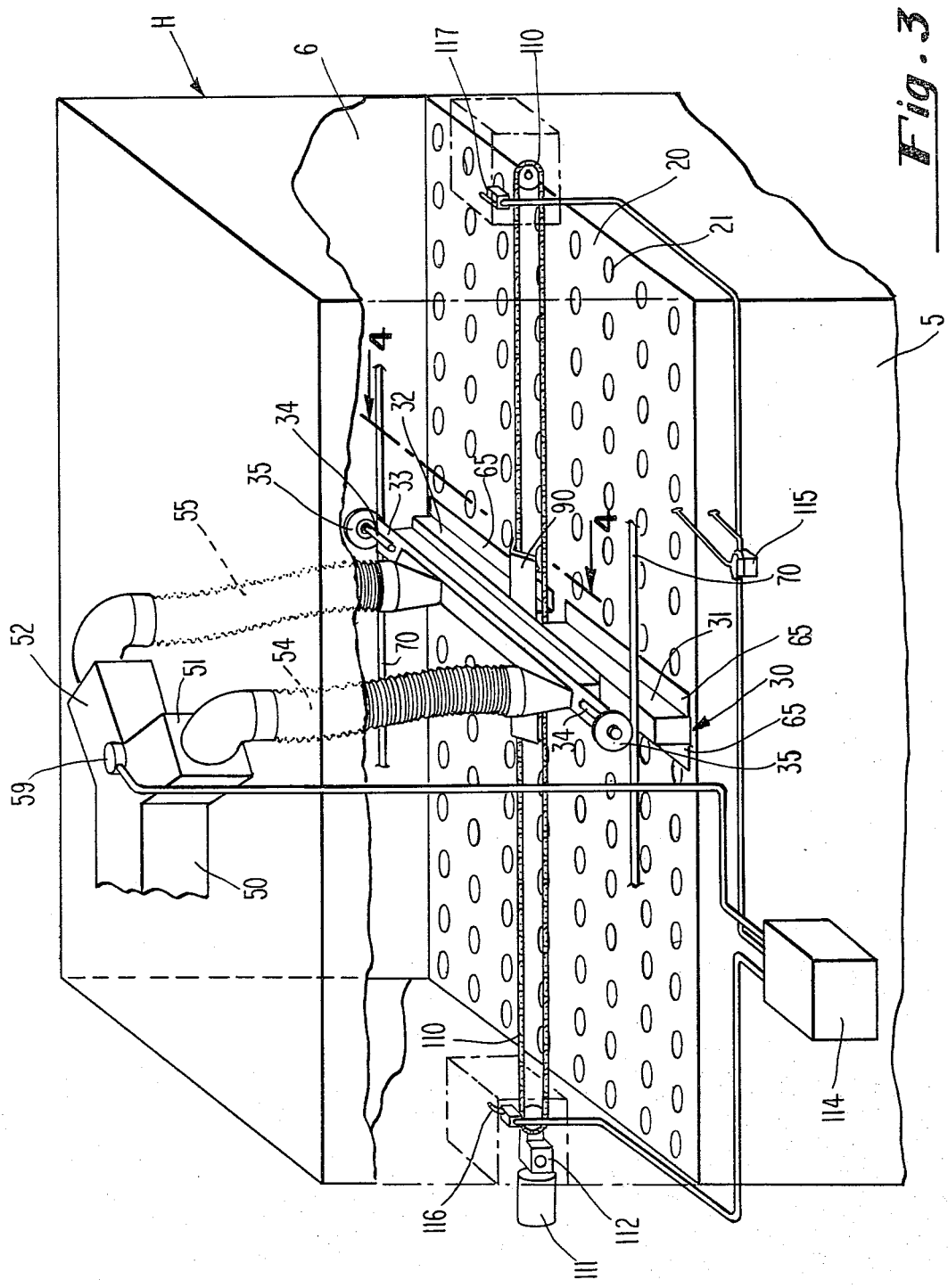
FIG. 3 is a diagrammatic illustration showing further details of the baghouse and traveling cleaning head or air-distribution manifold. The flexible ducts 54 and 55 leading to the traveling manifold are merely illustrative. The preferred form of duct is a knee-action duct illustrated in FIG. 7.
Figure 4:
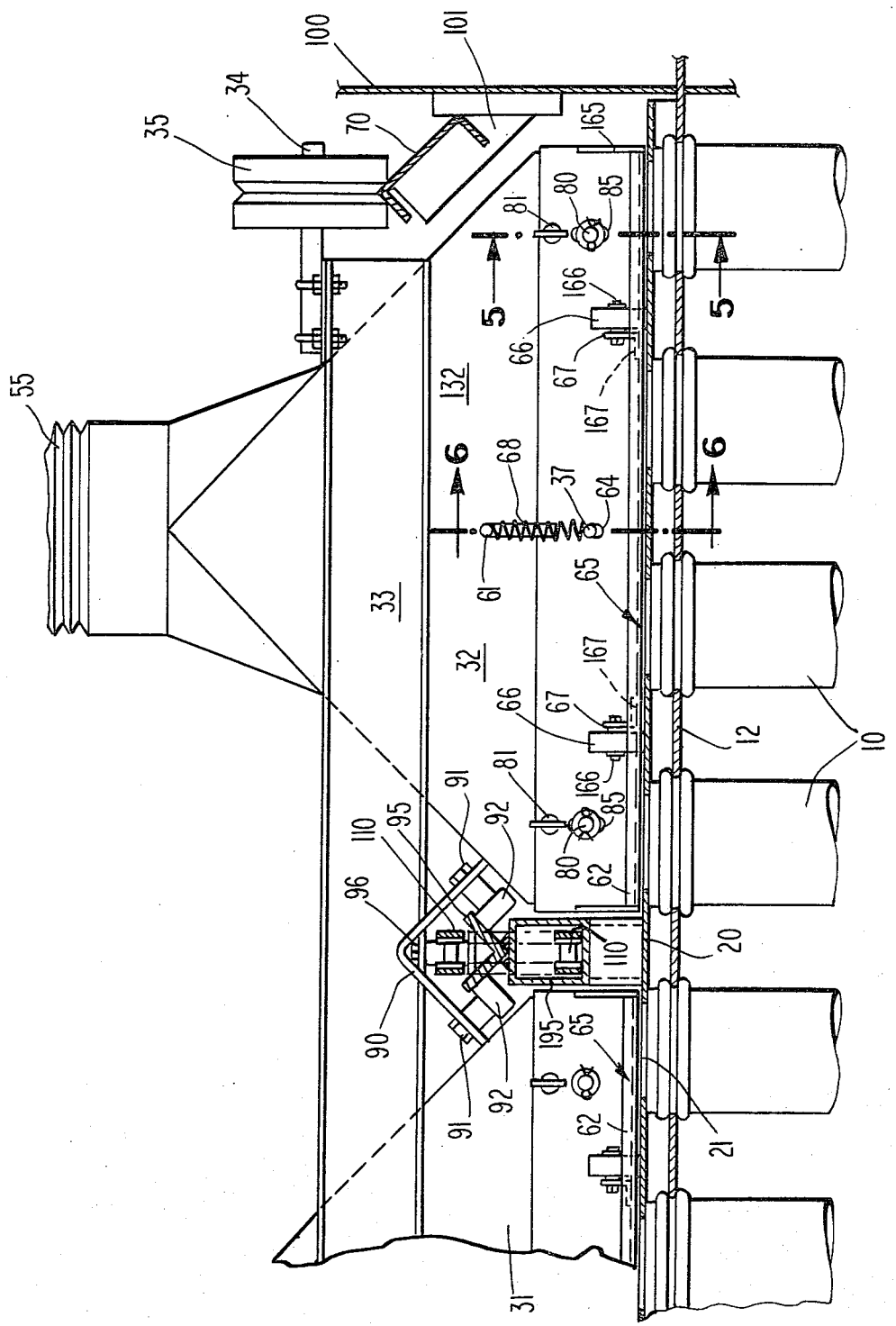
FIG. 4 is a diagrammatic elevational view looking along the line 4—4 of FIG. 3, showing the support means for the traveling manifold.

Reference is now made to FIGS. 3 and 4 which show diagrammatically the upper or clean-air chamber 6 of the baghouse H. Reference numeral 20 identifies the cover plate having an array of holes 21 therein each of which is in registry with the upper open end or mouth of one of the filter bags 10 which are not shown in FIG. 3 but which are supported in depending position from the support plate 12, as shown in FIGS. 1 and 4. Supported at each of the longitudinal sides of the baghouse H is a track 70 which supports and along which the traveling cleaning-head or manifold 30 rides. As already indicated, manifold 30 has two sections, a left section 31 and a right section 32 each substantially identical to the other. The two sections are connected together by a channel member 33 which extends the full length of the manifold 30. Secured to the opposite ends of channel member 33 are axles 34 which support grooved wheels 35 adapted to ride along the track 70.

The manifold 30 is caused to travel back and forth in the upper or clean-air chamber 6, in the longitudinal directions of the baghouse H, by a drive system which may be either electrical or hydraulic or other. In FIG. 3, an electrical drive system is indicated comprising a reversible motor 111 and a gear reducer 112 under the control of motor control 114. The ends of chain 110 are secured, as by an attachment block 96, to manifold 30 and, accordingly, when the chain 110 is driven it pulls along the manifold 30.

The means by which the endless chain 110 may be driven are well known and need not be described in great detail. As already indicated, either an electric or hydraulic drive, or a combination thereof, may be used. In FIG. 3, a motor-control box 114 is under the control of a differential pressure switch 115 so that the chain 110 is only driven when the pressure differential between the upper and lower chambers rises above a preselected value, and closes the switch contacts. Limit switches 116 and 117 are provided at each end of the drive for reversing the direction of the drive when the manifold 30 reaches a limit position. Control box 114 also controls the actuation of a diverter-valve actuator 59 which controls whether the pressurized reverse air from a blower not shown flows through duct 50 in leg 51 or leg 52 of the Y connection to which the upper ends of "knee" ducts 54 and 55 are connected. In the apparatus illustrated in FIG. 3 and presently being described, when manifold 30 is traveling from left to right, the pressurized reverse air in duct 50 is directed into leg 52 and passes down through bendable "knee" duct 55 into manifold section 32. After termination of travel from left to right, and before start of travel from right to left, the diverter-valve actuator 59 is actuated and the reverse air is then diverted away from leg 52 into leg 51 so that on the return travel (from right to left) the reverse air passes down through bendable knee duct 54 and into manifold section 31.

Reference is now made to FIG. 4. This figure shows further details of the construction of the traveling manifold 30. As has already been indicated, the traveling manifold 30 comprises two sections, a left section 31 and a right section 32. The two sections are connected together by a channel member 33 which extends the full width of the manifold 30. The two sections 31 and 32 are substantially identical, and it will be necessary to describe but one of them in detail.

FIG. 4 shows the bendable knee duct 55 connected to the upper portion of the manifold section 32. The upper portion has inclined walls which extend downwardly and outwardly and connect to a pair of spaced apart vertical sidewalls 132 which define the elongated interior channel 36 (see FIGS. 5 and 6) through which the pressurized reverse air passes downwardly before passing through holes 21 in cover plate 20 and into the mouths of the filter bags 10 located therebeneath.

Extending along each sidewall 100 of the baghouse H is a support bracket 101 which supports, in an inclined position, an inverted channel member 70 which functions as one of the rails or tracks along which the manifold 30 travels. As seen in FIG. 4, one corner of the inverted channel track member 70 is received within a groove in the wheel 35. Wheel 35 is mounted on an axle 34 which is mounted, as by U-bolts, to the ends of the channel member 33.

Connected between the left and right manifold sections 31 and 32 and extending for only a short longitudinal distance in the central portion of the baghouse H, is an inverted support angle 90 to which guide rollers 92 on studs 91 are secured. In the embodiment presently being described, two guide rollers 92 are supported, spaced lengthwise from each other, from each leg of the support angle 90. Supported along the length of the baghouse, and extending the full length thereof, is an elongated angle member 95, seen in section in FIG. 4. Angle member 95 is supported on a tube 195 which extends the full length of the baghouse and through which the lower reach of chain 110 passes, as seen in section in FIG. 4. (For purposes of simplicity, tube 195 and angle member 95 have been omitted from FIG. 3). The ends of chain 110 are connected to a block 96 secured to channel member 33. Consequently, when chain 110 is driven, in one direction or the other, the manifold 30 is pulled along by the chain. The guide rollers 92 bear against the under-surface of the legs of the elongated angle member 95, and, acting in combination with wheels 35, assure that the traveling manifold 30 will not leave the rails 70.

As has already been indicated, as manifold 30 travels back and forth the full length of the baghouse H, pressurized reverse air is continuously being pumped into either the left section 31 or the right section 32 of the manifold. Manifold 30 is pulled along by chain or cable 110 at a constant rate, and as manifold 30 approaches and reaches each row of openings 21 in cover plate 20, the reverse-air delivery channel 36 (FIGS. 5–6) of the manifold 30 will be in registry with and will cover first a small portion and then an increasingly larger portion of the openings in the row until the entire opening is covered, after which the portion of the opening 21 covered will decrease to zero. It has been discovered, unless some sort of seal is provided against leakage, that during the time when the channel 36 of the manifold is in registry with less than the full opening, the reverse air which is being pumped downwardly through channel 36 and through opening 21 into the mouth of the tubular filter bag 10 suspended therebeneath, will tend to escape upwardly and outwardly into chamber 6 through the uncovered portion of the opening 21. In accordance with the present invention, such an undesirable condition is avoided by providing manifold 30 with end plates 165 and leading and trailing seal plates 65 and with means for maintaining the feet 63 of the seal plates 65 at very close spacing from cover plate 20, despite unevenness in the level of cover plate 20. The end plates 165 and the full-width leading and trailing seal plates 65 prevent the pressurized reverse air which is being projected downwardly through interior channel 36 of the traveling manifold 30 from escaping into the upper chamber 6, and force such reverse air to pass through opening 21 in cover plate 20 and into the interior of the filter bag 10 suspended therebelow. The end plates 165 and the full-width trailing and leading seal plates 65 are seen best in FIG. 5 and will now be described. Plates 65 are also seen clearly in FIG. 6.

Figure 5:
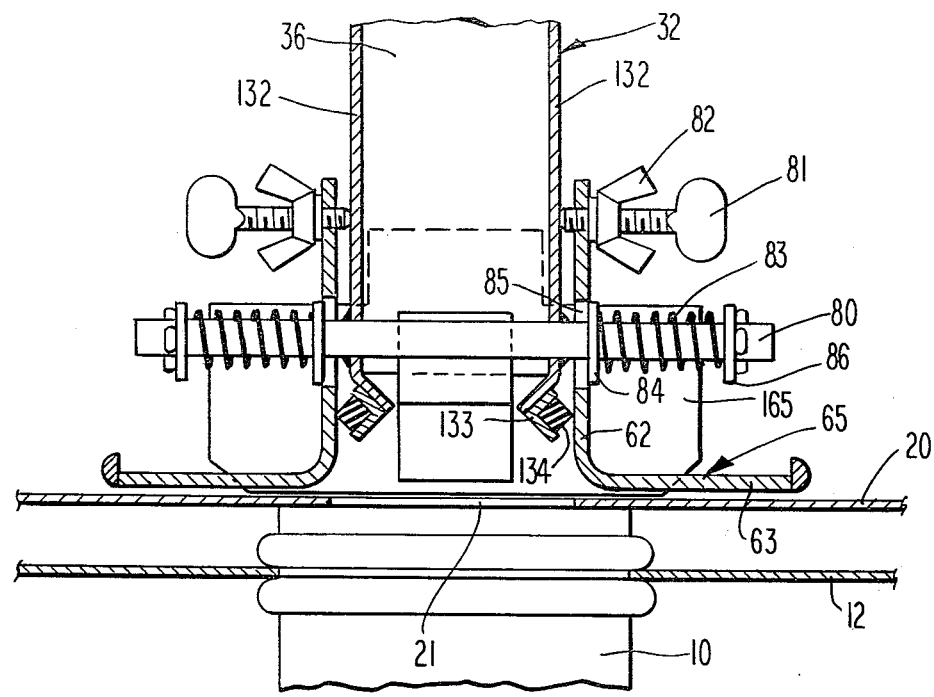
FIG. 5 is a elevational view, partly in section, looking along the line 5—5 of FIG. 4, showing the adjustment mechanism for the side seal plates of the manifold.
Figure 6:
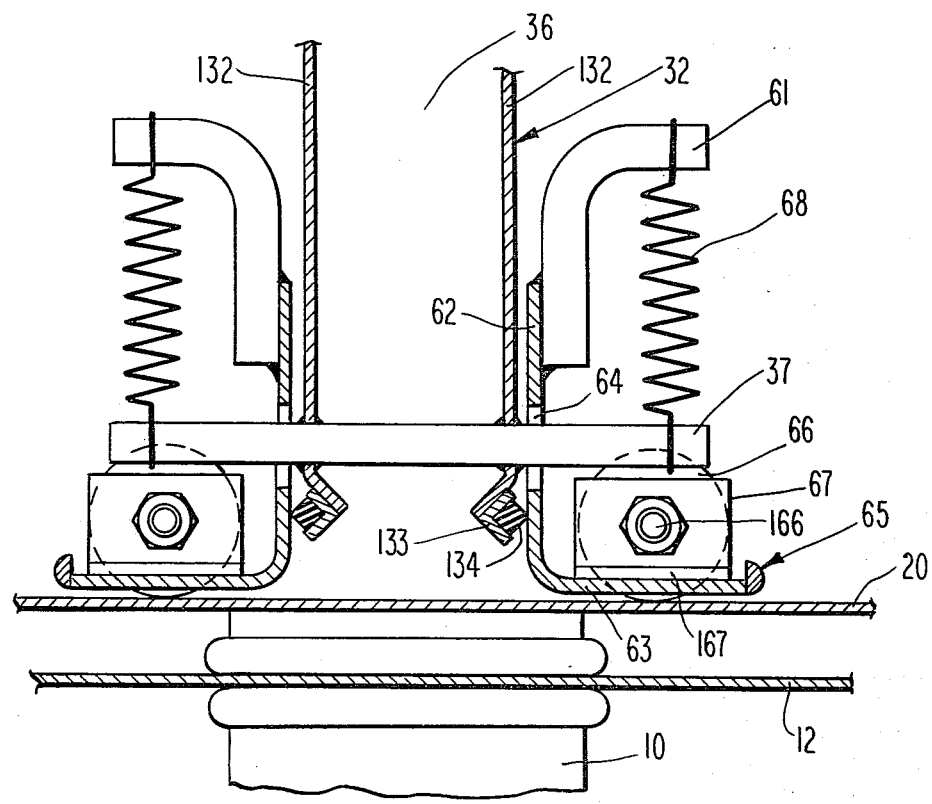
FIG. 6 is a elevational view, partly in section, looking along the line 6—6 of FIG. 4, showing the support means for the manifold side seal plates.

Referring now to FIGS. 5 and 6, these are views looking along the lines 5—5 and 6—6 of FIG. 4. In FIGS. 5 and 6, the interior channel 36 of manifold 30, through which the reverse air is blown downwardly toward the openings 21, is clearly seen, defined by the forward and rearward vertical walls 132 of the manifold.

The trailing and leading seal plates 65 of manifold 30 are substantially similar and are mounted in a substantially similar manner. Accordingly, it will be necessary to describe but one of them. It will be understood that the trailing seal plate 64 when the manifold is traveling in one direction becomes the leading seal plate 65 when the manifold is traveling in the reverse direction. As seen in FIG. 4, the seal plates 65 extend the full width of manifold section 31 or 32. The seal plates are so mounted that the foot portions 63 are closely spaced from the surface of cover plate 20, and this close spacing (for example, $\frac{1}{8}''$) is maintained despite irregularities in the flatness of cover plate 20.

Reference is now specifically made to FIG. 6 which shows the rollers 66 on which the leading and trailing seal plates roll when the manifold 30 is pulled by chain 110 back and forth across the length of the baghouse. Each roller 66 is mounted on an axle 166 which is supported in the vertical leg 67 of an angle member 167 secured, as by welding, to a foot 63 of a seal plate 65.

Secured, as by welding, to the lower end portion of each of the vertical walls 132 of manifold 30 is a horizontally extending arm 37 which extends through a vertical slot 64 in a vertical leg portion 62 of a seal plate 65. Secured, as by welding, to the upper end portion of vertical leg 62 is an inverted L-shaped spring-support arm 61 which extends upwardly and then outwardly. Connected between spring support arm 61 and horizontal arm 37 is a tension spring 68 which tends to pull arm 61 downwardly toward arm 37. This has the effect, of course, of pulling down on the vertical leg portion 62 of seal plate 65, thereby forcing down foot portion 63, and hence maintaining the rollers 66 in close contact with the surface of cover plate 20. The slot 64 in the leg 62 has, of course, a length in the vertical direction sufficient to allow for the necessary up-and-down movement of leg 62. As seen in FIG. 4, two pairs of rollers 66, supported by spring-loaded mechanisms such as shown in FIG. 6 and described above, are provided for each of the two manifold sections 31 and 32. In brief, the effect of the construction just described is to cause the rollers 66 to follow the contour of the surface of cover plate 20, thereby to maintain the foot 63 of the seal plate 65 close to the cover plate 20 at all times during the travel of manifold 30 back and forth across the baghouse.

In accordance with the present invention, provision is also made for adjusting the angular position of the foot 63 of the seal plate 65 relative to cover plate 20. Such adjustment means are illustrated in FIG. 5, to which reference is now made.

As seen in FIG. 5, secured, as by welding, to the lower end portion of each of the vertical walls 132 which define the air-passage channel 36 is a rod 80 which extends laterally through slots 85 in each vertical leg 62 of the seal plates 65. Secured to the upper end portion of each vertical leg 62 is a thumb screw 81 which passes through a threaded hole in leg 62 and bears against the outer surface of vertical wall 132. A wing nut 82 is provided for locking the position of thumb screw 81. Mounted on lateral rod 80, at each end thereof, is a compression spring 83 compressed between a pair of retaining washers 84 and 86.

The lowermost edge of each of the vertical walls 132 is bent inwardly and secured thereto, as by welding, is an elongated angle member 133 which extends the full width of the manifold section 31 or 32. Supported on angle member 133 is an elongated bar 134 of resilient material, such as plastic or rubber, against which the vertical leg 62 of seal plate 65 bears. It will be seen, from an examination of FIG. 5, that if thumb screw 81 is turned in a tightening direction, the upper portion of leg 62 will move outwardly from the vertical wall 132. This will cause the vertical leg 62 to tend to compress spring 83 on rod 80 but spring 83 will act to maintain the lower part of leg 62 in contact with bar 134. Thus, leg 62 will move pivotally, with the apex of bar 134 as the pivot point. As a result, the outward end of foot 63 of seal plate 65 will move closer toward cover plate 20. If, on the other hand, thumb screw 81 is turned in a loosening direction, compression spring 83 will force the upper end portion of leg 62 more closely toward the vertical wall 132 and the outer end of the foot 63 will tend to move away from cover plate 20. In brief, the adjusting mechanism illustrated in FIG. 5 is capable of adjusting the angular position of the foot 63 of seal plate 65 relative to cover plate 20 by causing leg 62 to pivot in one direction or the other about the lateral rod 80.

End seal plates 165, seen in FIGS. 3, 4 and 5, close the ends of sections 31 and 32 of manifold 30 and prevent escape of pressurized reverse air into upper chamber 6.

SUMMARY

In the dust collector of the present application, high-energy pressurized bag-cleaning air is directed into the open mouths of the filter bags for continuous cleaning of the filter bag walls, typically a fabric having a wire support cage. The high energy cleaning air flows in a direction opposite to that of the dustladen process air and blows the accumulated dust from the outside surface of the filter bags.

The dust collector housing is rectangular. The filter bags are preferably (but not necessarily) circular in cross section. The bags are arranged in rows. An air-distributing manifold travels back and forth along the length of the collector housing and distributes the high-energy reverse air to one row of bags at a time. To minimize the horse power requirements of the reverse air blower, only one half of one row of bags is cleaned at one time. Thus, if there are eight bags in a row, four bags are cleaned at one time. The pressurized reverse air is directed to one half the bags in each row by means of a diverter valve which is fixed to the dust collector housing. The diverter valve is connected to the air-distributing manifold by two bendable extendable "knee" type ducts. One duct connects the diverter valve to one half of the manifold; the other duct connects the diverter valve to the other half of the manifold. When the manifold reaches the end of its travel, the diverter valve is actuated and it reroutes the cleaning air so that it blows through the other duct and the other half of the manifold. The effect is to clean the bags in the rectangular housing in what may be referred to as a circular order. That is to say, the bags located on one half of the housing center line are cleaned in succession beginning, for example, at the right end of the housing and ending at the left end. Then the bags located on the other side of the center line are cleaned, beginning at the left end and ending at the right end. The cycle is then repeated, providing a generally circular cleaning pattern, clockwise or counterclockwise.

The reverse air-distributing manifold may be pulled along by a sprocket-and-chain or cable drive, driven, for example, by a reversible one-quarter or one-half horsepower gearmotor. The diverter valve may be powered by an electric motor-driven actuator. Synchronization of the two reversible devices may be provided by an electrical control panel capable of operation either in the manual or fully automatic mode. Inputs may be provided to the panel by a differential pressure switch which, when used, governs the cleaning action so that the manifold sweeps over the bags only when the differential pressure in the upper and lower chambers rises above a preset level, thereby closing the switch contacts. When the differential pressure falls below the preset level, the reverse air manifold will continue to the end of its travel and then stop. It will then wait until the differential pressure again rises above the preset level. The manifold will stop at either end of the collector housing, depending upon the direction of travel at the time when the low differential signal is received. Air flow through the reverse air manifold is blanked off whenever the manifold reaches either end of its travel but is not blanked off during the travel of the manifold from one end of the housing to the other.

Figure 8:
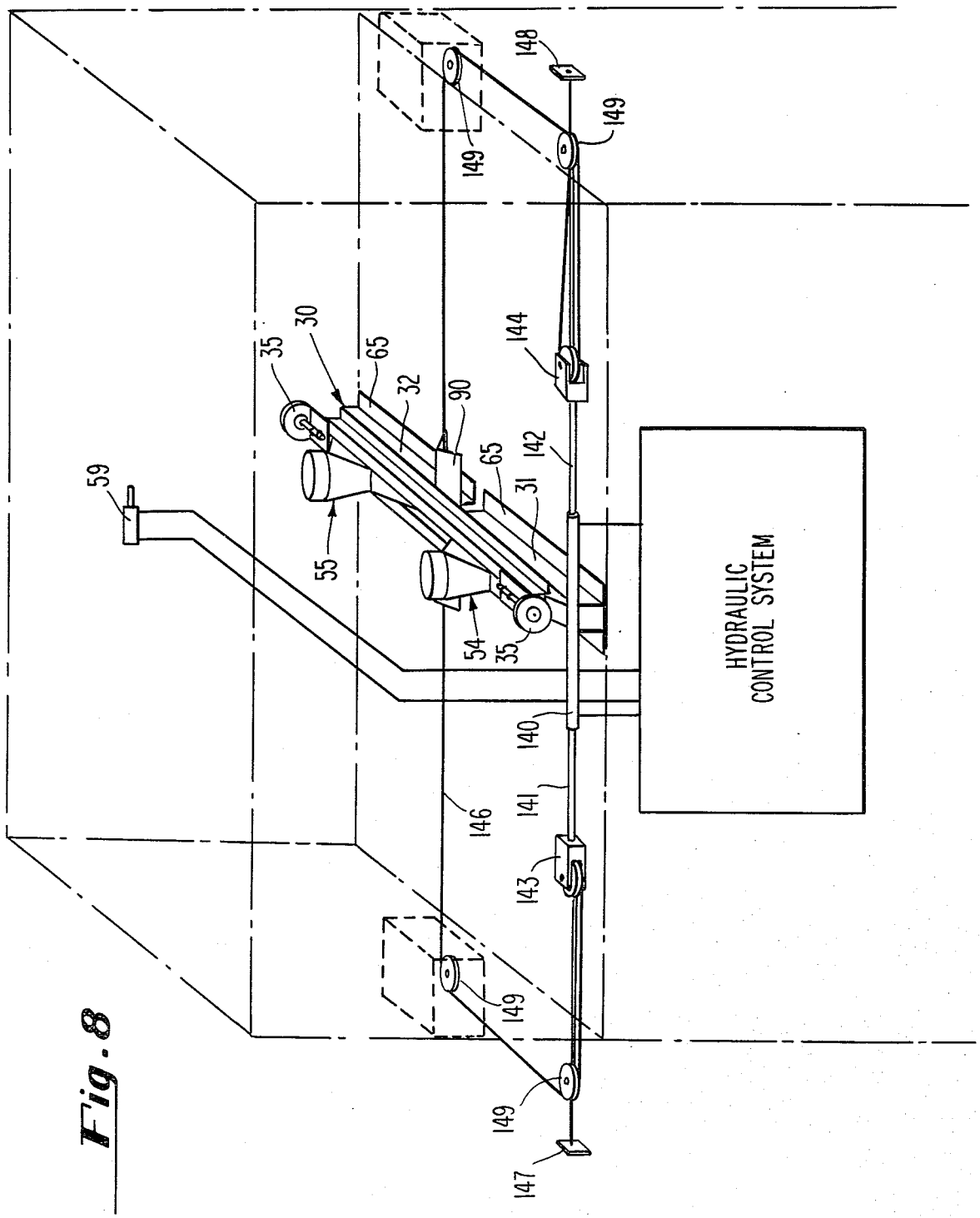
FIG. 8 is a schematic illustration of a hydraulic drive system for driving the traveling manifold back and forth and for operating the diverter valve in timed relationship with the movement of the manifold.
Figure 9:
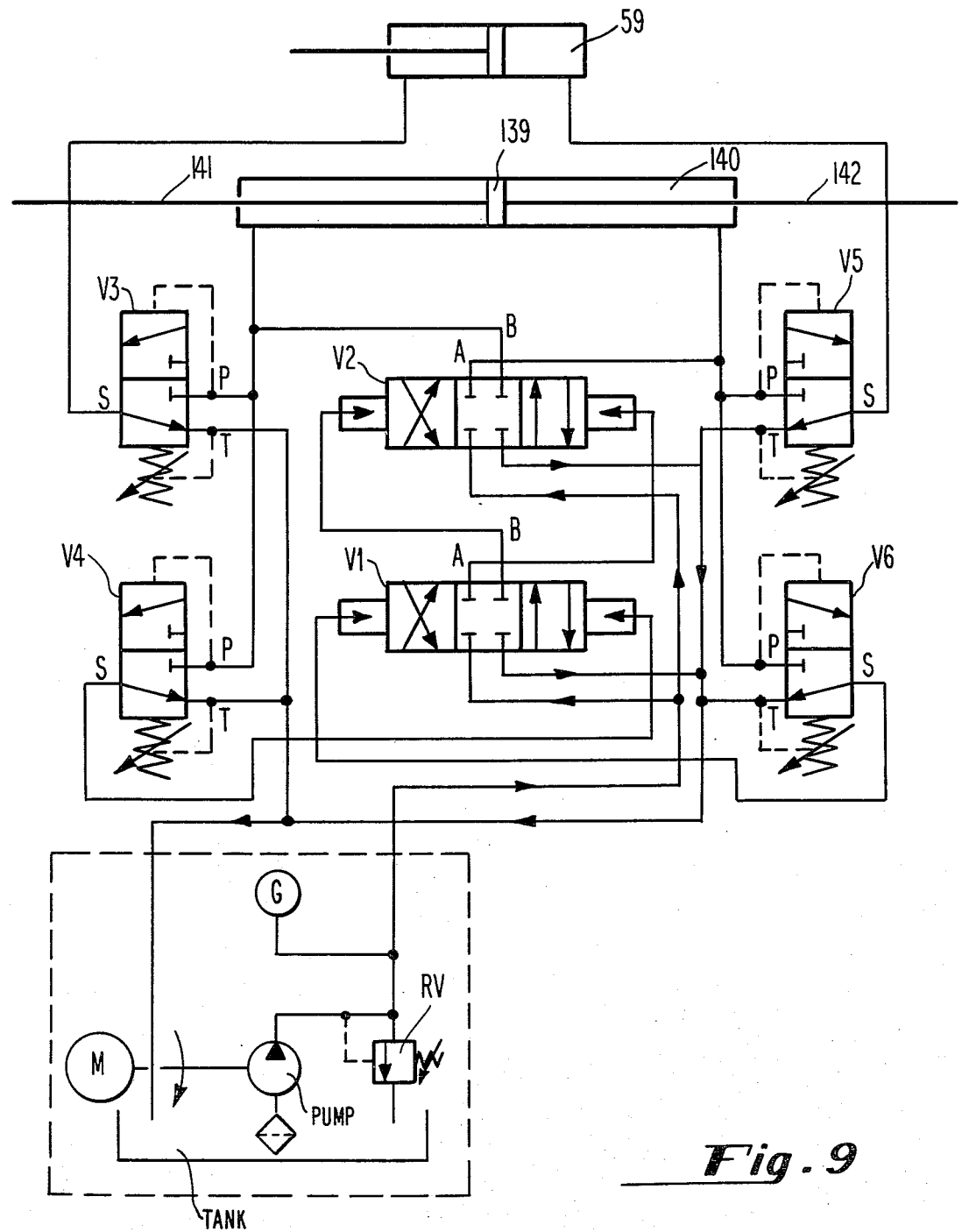
FIG. 9 is a schematic illustration of a control circuit for controlling the hydraulic system of FIG. 8.

In lieu of using a sprocket-and-chain gearmotor drive, the manifold may be driven by a hydraulic drive. Motion may be transmitted through a one-eighth inch diameter stainless steel cable and aircraft control pulleys. The hydraulic drive system, and the control system therefore are shown in FIGS. 8 and 9 which are described later. It may be said generally that reversal of the drive cylinder and of a second cylinder located at the diverter valve is fully automatic. Hydraulic pressure rise is sensed and is used to shift the directional control valves whenever the drive cylinder reaches the end of its travel. The small cylinder at the diverter valve is sequenced to actuate before the drive cylinder to make certain that the pressurized reverse air is fully diverted before the traveling manifold begins to move. The drive cylinder and diverter valve cylinders may be small-diameter low-pressure units. A differential pressure switch may be provided to stop the cleaning mechanism whenever the pressure drop across the filter bags falls below a preset limit and the traveling manifold reaches one end or the other of its longitudinal travel.

The high energy air for the manifold may be provided by a pressure blower which supplies cleaning air through the diverter valve and knee ducts. At the level of the bag tops and just above the bag support sheet, removable cover sheets present a smooth surface to the air distribution manifold. Small wheels on the seal assembly maintain a ⅛ inch gap or less between the seal assembly and the cover sheets to prevent excessive reverse air leakage regardless of variations in the flatness of the cover sheet surface. Leading, trailing, and end seal plates on the manifold inhibit leakage of reverse air into the upper chamber.

The manifold has two half sections, each similar to the other. Located between the two half sections of the air-distributor manifold and attached thereto is an inverted angle member on which four guide rollers are mounted. A fixed elongated angle member is built into the drive chain support structure and on this fixed angle member the guide rollers ride, thereby to guide and stabilize the manifold as it travels along. Two grooved six-inch diameter wheels support the weight of the air-distributor manifold. These wheels ride on removable tracks which run the length of the collector housing, one track along each sidewall. The tracks are oriented at a 45° angle and are spaced away from the collector walls to prevent dust from building up under the grooved wheels. With the guide rollers riding on the undersurface of the fixed elongated angle member which is built into the drive chain support structure, and the large grooved wheels located over the two tracks at the housing sidewalls, it becomes virtually impossible for the reverse air manifold to leave the tracks as it travels therealong.

In the present application, the number of bags in a row has been indicated as eight, and the number of bags cleaned at any one period of time has been indicated as four. However, a dust collector in accordance with the present application could be constructed to have less or more bags than eight in a row. For example, the number of bags in a row could be 6 or 10 or 12 or 14 or 16, etc, with corresponding increases in reverse air horsepower requirements.

Figure 7:
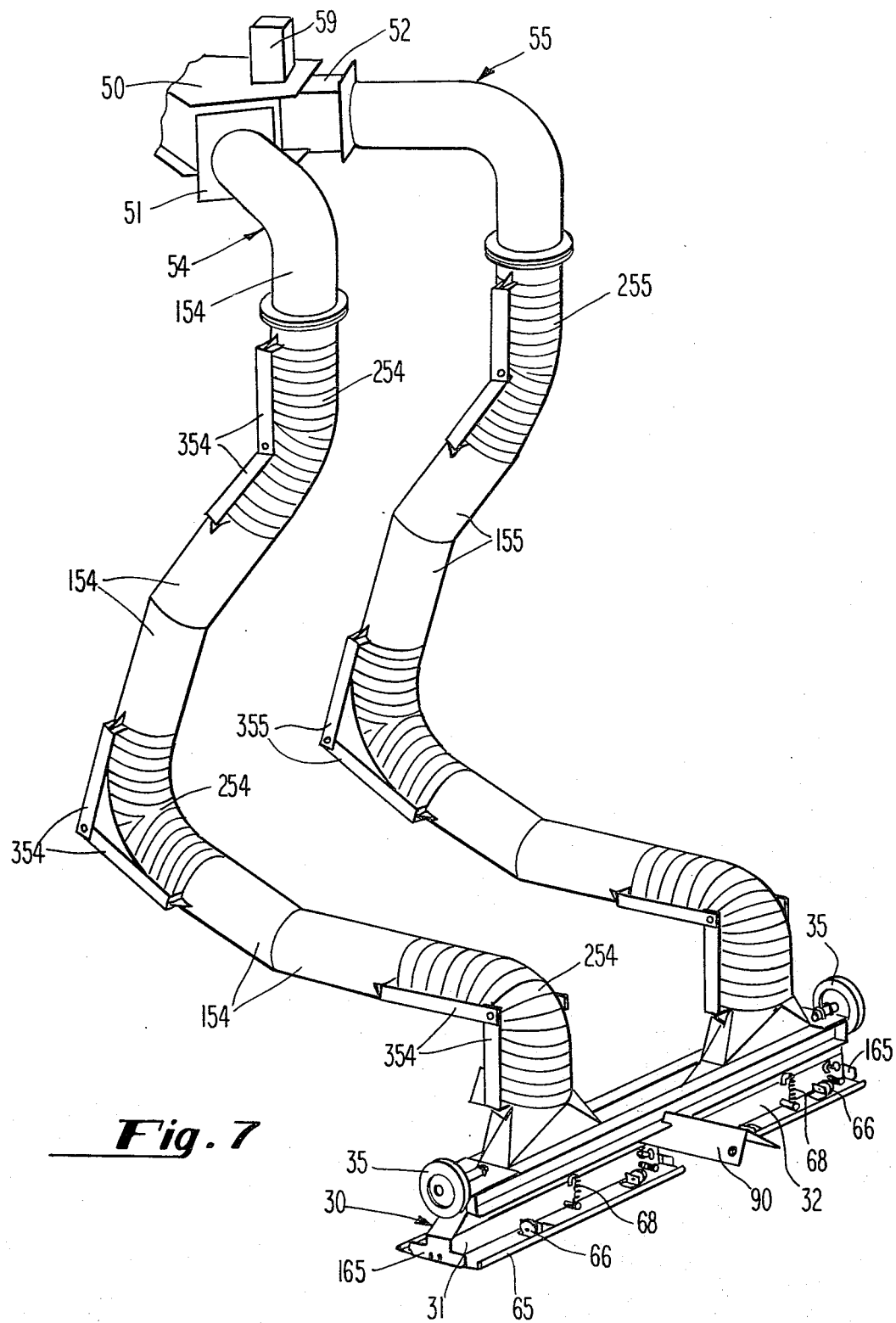
FIG. 7 is an illustration of a presently preferred form of duct, referred to herein as a "knee-action" duct extending from the diverter valve 59 to the traveling manifold 30.

As has already been indicated, the preferred form of duct for connecting the fixed source 50 of pressurized reverse air to the traveling manifold 30 is a knee-action type of duct. Such a type of duct is shown in greater detail in FIG. 7. The knee ducts 54 and 55 shown in FIG. 7 are substantially identical and only one of them (duct 54) will be described. Duct 54 comprises, in alternate arrangement, rigid sections 154 and flexible bendable sections 254. Spanning the flexible bendable sections 254 are hinged rigid link arms 354. The knee action ducts shown in FIG. 7 are capable of maintaining duct connections for passage of reverse air from the source 50 of pressurize reverse air to the manifold 30 as the manifold travels back and forth through the length of the baghouse. In knee-duct 55, rigid sections 155 correspond to sections 154 of knee duct 54, flexible bendable sections 255 correspond to sections 254, and hinge rigid link arms 355 correspond to arms 354.

As indicated previously in this specification, the manifold 30 may be driven back and forth by a drive system which may be either electrical or hydraulic or pneumatic or a combination thereof. In FIG. 3, a chain and sprocket drive is indicated driven by an electrically controlled system. In FIG. 8, there is indicated a cable drive system driven by an hydraulic control system. The details of the control system are shown in FIG. 9.

Referring now to FIG. 8, a cable 146, attached to manifold 30, is drawn around four fixed pulleys 149 and two movable pulleys carried by pulley blocks 143 and 144. The terminal ends of cable 146 are attached to fixed tie plates 147 and 148. Positioned between pulley blocks 143 and 144 is a piston cylinder 140 having a piston head 139 (FIG. 9) and two piston rods 141 and 142 extending in opposite directions from the piston head. The outer end of piston rod 141 is connected to the movable pulley block 143. The outer end of piston rod 142 is connected to the other movable pulley block 144. Extension of piston rod 141 and retraction of piston rod 142 will cause manifold 30 to move from left to right, as viewed in FIG. 8. Extension of piston rod 142 and retraction of piston rod 141 will cause the manifold 30 to move from right to left. Movement of the piston rods 141, 142 is controlled by an hydraulic control system shown in block form in FIG. 8. The details are shown schmatically in FIG. 9. This control system also controls the operation of diverter valve actuator 59.

Reference is now made to FIG. 9 which is a schematic representation of an hydraulic control system for controlling the drive system of FIG. 8. In FIG. 9, M identifies the motor, G the pressure gauge and RV the relief valve. Valves V1 and V2 are directional control valves having a number of ports two of which are identified A and B. Valves V3, V4, V5 and V6 are pressure sequencing valves having a number of ports three of which are identified P, S and T. Each of the sequencing valves is controlled by an adjustable spring. These springs are so adjusted that valves V3 and V5 sequence or shift at a lower pressure than do valves V4 and V6.

When the sequencing valves V3 and V5 are in the positions shown in FIG. 9, hydraulic fluid from the cylinder of diverter valve 59 flows back to the tank by way of valve V3 or valve V5. It flows back through valve V5 when piston 159 is moving from left to right; it flows back through valve V3 when piston 159 is moving from right to left.

Two directional valves V1 and V2 are used, rather than one directional valve, to prevent the possibility of the directional valve stalling when shifting through its centered or fully closed position. Both of the directional valves V1 and V2 are shown in this position in FIG. 9. If both valves were in this position, the circuit would not be able to operate. Actually, both of directional valves V1 and V2 would never be centered at the same time.

The operation of the control system of FIG. 9 will now be briefly described. Assume that directional valve V1 is in its right hand position. In such position, the left section is operative, and hydraulic fluid flows from the pump out through port B of valve V1. This causes directional valve V2 to shift to its right hand position. Fluid from the pump now flows out of port B of valve V2 and causes piston 139 of the cable drive cylinder 140 to shift to the right. Hydraulic fluid from the right hand portion of the drive cylinder 140 returns to the tank by way of port A of directional valve V2. When piston 139 of the drive cylinder 140 reaches the end of its travel to the right, there is a substantial increase in pressure at the opposite end of the drive cylinder 140 and at port P of sequencing valve V3. This pressure rise causes valve V3 to sequence, i.e., to shift downwardly from the position shown in FIG. 9 against the action of its adjustable spring. Fluid then flows out of port S of valve V3 and into the left portion of diverter valve actuator 59, causing piston head 159 to move to the right.

When piston head 159 reaches the end of its travel to the right, an additional increase in pressure occurs at port P of sequencing valve V4. This pressure rise causes valve V4 to sequence, i.e. to shift downwardly from the position shown in FIG. 9 against the action of its adjustable spring. Fluid then flows out of port S of valve V4 and causes the directional valve V1 to shift to the left. Fluid from the pump then flows out of port A of directional valve V1 and causes directional valve V2 to shift to the left. Hydraulic fluid from the pump then flows out of port A of directional valve V2 and causes piston 139 of cable drive cylinder 140 to move to the left. When piston head 139 reaches the end of its travel to the left, there is a substantial increase in pressure at the opposite end of cylinder 140 and at port P of sequencing valve V5. This causes valve V5 to sequence, i.e., to shift downwardly from the position shown in FIG. 9 against the action of its adjustable spring. Fluid then flows out of port S of valve V5 and into the right portion of the diverter valve actuator 59. This causes piston 159 to move to the left. When piston 159 reaches the end of its travel to the left, there is a further increase in pressure at port P of valve V6. This causes valve V6 to sequence, i.e., to shift downwardly from the position shown in FIG. 9 against the action of its adjustable spring. Fluid then flows out of port S of valve V6 and causes directional valve V1 to shift to the right. The sequence just described then repeats.

What is claimed is:

1. In a dust collector baghouse having upper and lower chambers, a plurality of tubular dust-collecting filter bags suspended in the lower chamber in an array of uniformly spaced rows, said filter bags having open mouths at their upper ends, and means causing a flow of process air upwardly from said lower chamber through the walls of said filter bags and through said open mouths into said upper chamber, the improvement comprising:

a. a flat support plate supporting said bags and separating said upper and lower chambers;
   b. an air-distribution manifold in said upper chamber, said manifold having a length in the widthwise direction of said baghouse corresponding to the width of said upper chamber, said manifold having a width in the lengthwise direction of said baghouse sufficient to register with but a single row of bags;
   c. a source of continuous pressurized air which flows in a reverse direction relative to that of said process air;
   d. means directing said reverse-direction air continuously into said manifold;
   e. drive means for causing said manifold to travel back and forth the length of said baghouse for injecting pressurized reverse-direction air into said filter bags, one row at a time, said pressurized air flowing through the walls of said filter bags in said row in a reverse direction relative to that of said process air, whereby dust which has been collected on the outer surface of said tubular filter bags is blown off;
   f. seal means on said traveling manifold for inhibiting flow of pressurized reverse-direction air into said upper chamber;
   g. said upper chamber of said baghouse having a track extending along each longitudinal side of said baghouse;
   h. said traveling manifold having grooved wheels adapted to ride on said tracks;
   i. said air-distribution manifold being comprised of first and second half sections connected together; and
   j. guide rollers between said half sections for maintaining said manifold on said tracks.

2. Apparatus according to claim 1 wherein a cover sheet is provided having a plurality of openings in registry with the open mouths of the filter bags, and wherein said seal means includes:

a. horizontal seal plates on said manifold extending in both the leading and trailing directions;
   b. means maintaining said seal plates at close spaced separation from said cover sheet irrespective of variation in the flatness of said cover sheet.

3. Apparatus according to claim 2 wherein means are provided for adjusting the angular position of said seal plates relative to said cover sheet.

4. Apparatus according to claim 1 wherein a pair of angle members are provided, at least a first of which extends the full length of travel of said manifold, the second being secured to said manifold, said guide rollers being secured to said second angle member and bearing against said first angle member.

5. Apparatus according to claim 1 wherein a diverter valve is fixed to said source of continuous pressurized air and wherein a first and second duct extends from said diverter valve to said first and second half-sections of said manifold.

6. Apparatus according to claim 5 wherein said first and second ducts comprise alternately rigid sections and flexible bendable sections.

7. Apparatus according to claim 6 wherein hinged rigid link arms span said flexible bendable sections and connect said rigid sections.

8. Apparatus according to claim 1 wherein said drive means for causing said manifold to travel back and forth the length of said baghouse comprises a drive cable and hydraulic means for driving said cable in either of two directions.

9. Apparatus according to claim 8 wherein, except for said drive cable, said hydraulic drive means are located outside of said baghouse.

10. Apparatus according to claim 1 wherein said drive means for causing said manifold to travel back and forth includes a piston cylinder and a hydraulic control system.

11. Apparatus according to claim 1 wherein said drive means for causing said manifold to travel back and forth includes a chain-and-sprocket drive and electric control means for controlling said chain-and-sprocket drive.

12. In a dust collector baghouse having upper and lower chambers, a plurality of tubular dust-collecting filter bags suspended in the lower chamber in an array of uniformly spaced rows, said filter bags having open mouths at their upper ends, and means causing a flow of process air upwardly from said lower chamber through the walls of said filter bags and through said open mouths into said upper chamber, the improvement comprising:
   a. a flat support plate supporting said bags and separating said upper and lower chambers;
   b. an air-distribution manifold in said upper chamber, said manifold having a length in the widthwise direction of said baghouse corresponding to the width of said upper chamber, said manifold having a width in the lengthwise direction of said baghouse sufficient to register with but a single row of bags;
   c. a source of continuous pressurized air which flows in a reverse direction relative to that of said process air;
   d. means directing said reverse-direction air continuously into said manifold;
   e. drive means for causing said manifold to travel back and forth the length of said baghouse for injecting pressurized reverse direction air into said filter bags, one row at a time, said pressurized air flowing through the walls of said filter bags in said row in a reverse direction relative to that of said process air, whereby dust which has been collected on the outer surface of said tubular filter bags is blown off;
   f. seal means on said traveling manifold for inhibiting flow of pressurized reverse-direction air into said upper chamber;
   g. said air-distribution manifold being comprised of first and second half sections connected together;
   h. a diverter valve fixed to said source of pressurized air;
   i. a first and second duct extending from said diverter valve to said first and second half-sections of said manifold;
   j. said diverter valve between said source of pressurized reverse-direction air flow and said manifold functioning to restrict said air flow in any one time period to one half the length of said manifold and to inject during any one time period pressurized reverse-direction air into the open mouths of only that half of a single row of bags located on the same one side of the axial center line of the baghouse; and
   k. means, including an electrical actuator and an electric control system, for controlling said diverter valve such that at the end of the travel of said manifold in one lengthwise direction of said baghouse said diverter valve is operated so that during the return travel of said manifold pressurized reverse-direction air is injected into the open mouths of bags on the opposite side of the center line of said baghouse.

13. Apparatus according to claim 12 wherein said electric control system controls both said manifold and said diverter valve motion.

* * * * *